Oct. 3, 1939.　　　C. A. RALL　　　2,174,758
MULTISPEED MOTOR
Filed Feb. 29, 1936　　　3 Sheets-Sheet 2
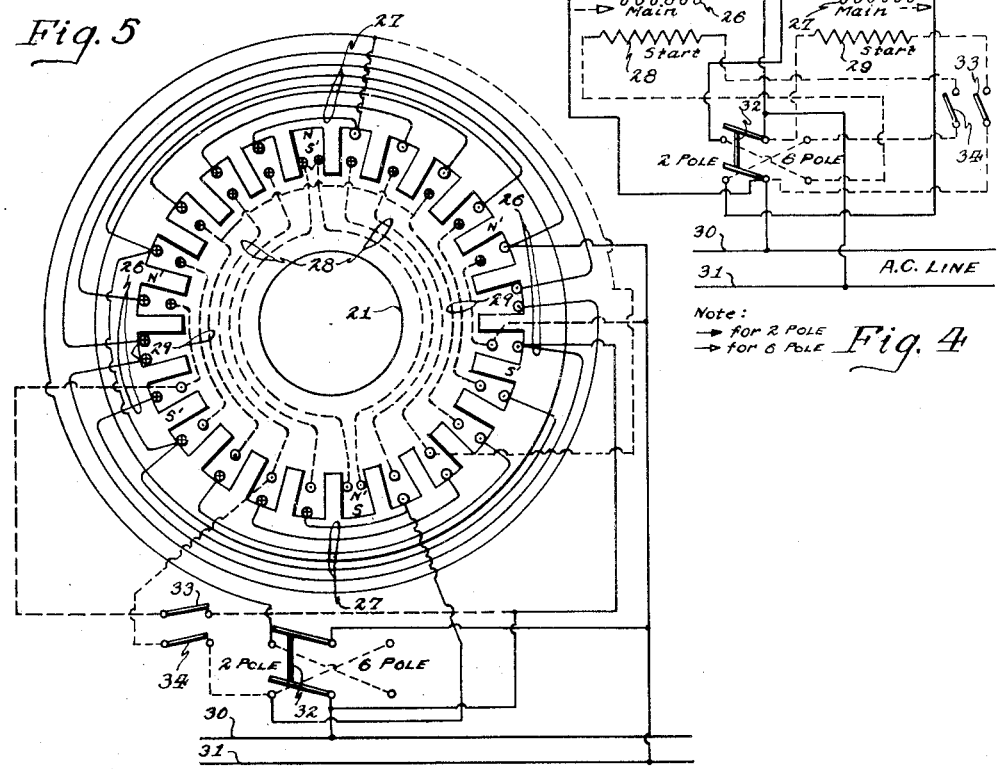
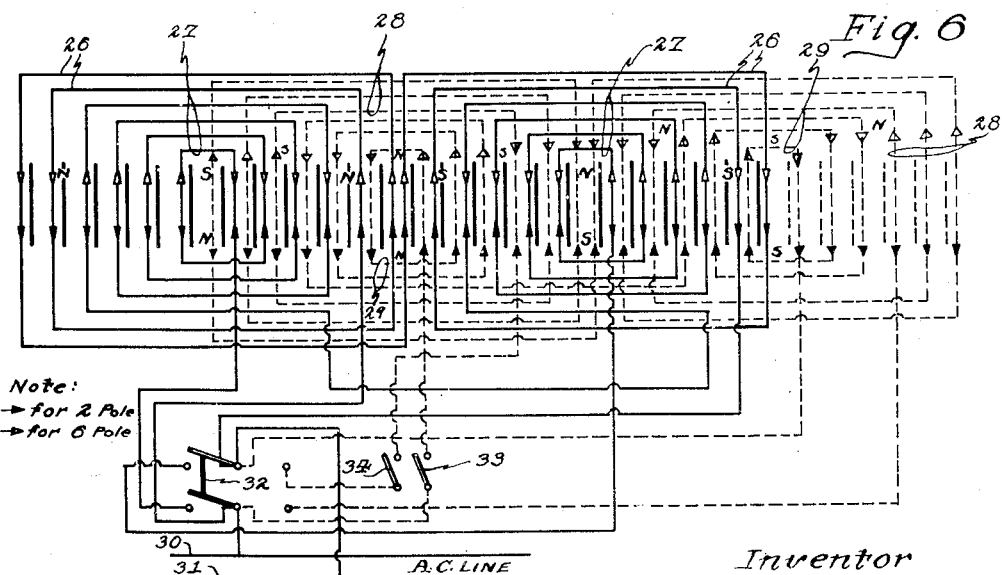

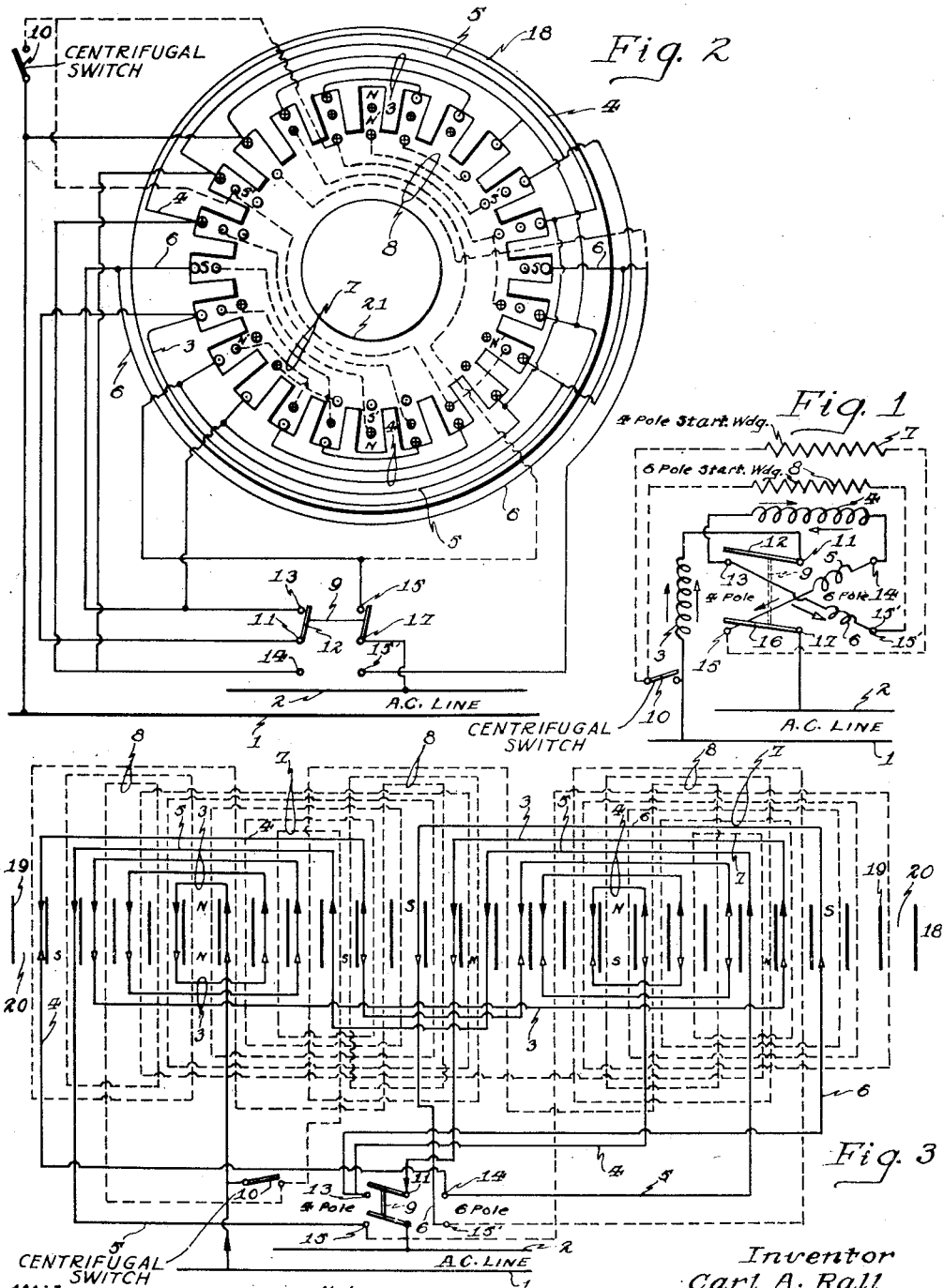

Oct. 3, 1939. C. A. RALL 2,174,758
MULTISPEED MOTOR
Filed Feb. 29, 1936 3 Sheets-Sheet 3

Note:
→ for 2 Pole
⇢ for 8 Pole

Witnesses:
Adolph T. Berg
Fred M. Davis

Inventor
Carl A. Rall
By Rummler, Rummler & Woodworth
Attys.

Patented Oct. 3, 1939

2,174,758

UNITED STATES PATENT OFFICE 2,174,758

MULTISPEED MOTOR

Carl A. Rall, Chicago, Ill., assignor to Bodine Electric Company, Chicago, Ill., a corporation of Illinois Application February 29, 1936, Serial No. 66,387

4 Claims. (Cl. 172—274)

This invention relates to self-starting multispeed electric motors and more particularly to alternating current induction motors having slotted field members to receive the exciting coils. Although my improved motor is not limited in use to any particular phase, it is especially well suited for single phase service; and for practical reasons I prefer the stator-field and rotor-armature type of machine.

This invention is applicable to all kinds of single and multiphase motors of the self-starting induction multispeed type.

My purpose generally is to produce better and more efficient motors of the kind referred to, and especially to reduce the cost of production and maintenance of such motors, and to simplify their operation and control and thus enhance commercial favor and widen the field of ready acceptance thereof.

Some of the objects of my invention are to provide for changing the speed of such motors by variplural polarity control; to provide a better form and arrangement of windings on the field member; to provide for outside permutative switching of the field windings for control of the motor speed by appropriate variplural polarity adjustment; to provide for distributing the field windings in a uniformly slotted ring; and to provide a split phase alternating current motor having main and starting coils so arranged and connected that by means of an outside switch different numbers of poles can be obtained, and thus different speed characteristics.

Further objects will also appear from the following description, taken in connection with the accompanying drawings, whereby the invention is illustrated.

Figure 1 is a circuit diagram for selective four-or-six pole multispeed motors, except that the inductive secondary or rotor winding is omitted.

Fig. 2 is mainly a diagrammatic end view of the field member and rotor for Fig. 1. For the sake of simplicity only one of the two sets of the four-pole starting windings is shown and only one of the three sets of the six-pole starting windings is shown. The four-pole starting winding consists of two coils and the six-pole winding consists of three coils. The four-pole starting winding produces two real and two consequent poles, and the six-pole winding produces three real and three consequent poles.

Fig. 3 is a winding diagram corresponding with Fig. 1.

Fig. 4 is a circuit diagram for a two-or-six-pole multispeed motor, excepting the secondary or rotor winding.

Fig. 5 is a diagrammatic end view of the field member and rotor for Fig. 4.

Fig. 6 is a winding diagram corresponding with Fig. 4.

Four-or-six-pole motor

Figure 8:
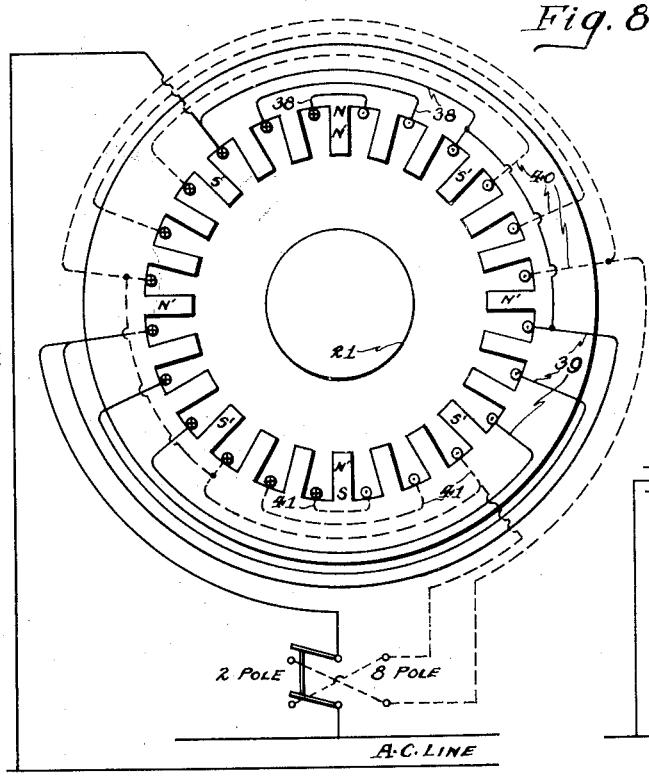
Fig. 8 is a diagrammatic end view of the field member and rotor of Fig. 7.

Referring further to Fig. 1, it is to be noted that the motor field circuit, connected across the power supply line conductors 1 and 2, includes a main winding, comprising sections 3 and 4 together with either of sections 5 or 6 connected in series, a four-pole starting winding 7, and a six-pole starting winding 8. It also includes a double pole double throw switch 9, and a centrifugal automatic cutout 10.

Section 3 of said main winding has unvarying operative relation to the power line. Section 4 is reversible by switch 9 relative to winding 3, one way being for four-pole and the other way for six-pole operation of the motor.

Section 5 of said main winding is connected for four-pole operation, and section 6 is connected for six-pole operation. The operative relation of these sections relative to the power line is unvarying.

The said means 9 is a double-pole double-thrown switch. The winding sections 5 and 6 are connected across the outer contacts of the switch 9 in the two diagonal directions thereof respectively.

For four-pole operation in starting, the circuit extends from power lead 1 to main winding section 3. Through section 3 the circuit leads to the middle contact 11 of switch 9. From here the circuit continues through blade 12 to contact 13 for four-pole operation and thence to winding section 4, thence to contact 14, thence through section 5 to contact 15, thence through blade 16 to contact 17 and thence to the opposite lead 2 of the power supply line.

For six-pole operation in starting, the circuit extends from power lead 1 to main winding section 3. Through section 3 the circuit leads to the metal contact 11 of switch 9. From here the circuit continues through blade 12 to contact 14 and thence to winding section 4, thence to contact 13, thence through section 6 to contact 15', thence through blade 16 to contact 17 and thence to the opposite lead 2 of the power supply line.

The foregoing explanation, with reference to Fig. 1, applies also substantially with reference to Figs. 2 and 3. It will be seen that the throw of switch 9, one way or the other, thus determines the relative speed of the motor.

Referring further to Fig. 2, the main winding is shown connected for four-pole operation, as indicated by the crosses and dots on the main winding circles in the bottom of the slots.

Here there are two circles having neither dots or crosses, indicating that no current is flowing in the coil 6.

This operation is also shown by the relation of dots and crosses in the four-pole starting winding, (see middle circles), only one-half of which are shown connected in Fig. 2, for the sake of simplicity. Here each set of five crosses and five dots (see middle row of circles) indicates one of the two coils composing winding 7, the connection for the other coil not being shown.

Referring now more in detail to said Fig. 3, the several circuit parts correspond with those on Fig. 1. The field member 18 is indicated conventionally by the horizontal row of heavy vertical lines 19 representing teeth. The spaces 20 between these teeth 19 represent slots. The main windings are indicated by full lines and the starting windings by broken lines, as also in Figs. 1 and 2.

The arrows shown on Fig. 3 indicate instantaneous corresponding directions of current in the various main winding parts. The upper row of arrows, all shown with solid heads, indicate current flow direction for four-pole operation; and the lower row all shown with hollow heads indicate current direction for six pole operation.

The poles are all indicated positionally by the letters N and S, the upper row of letters indicating four-pole operation and the lower row six-pole operation.

On the conventional end view, Fig. 2, the relative position of the slotted field member 18, the rotor 21 and the field windings, is indicated generally. The circle crosses indicate instantaneous corresponding retreating direction of current and the circle dots indicate instantaneous corresponding approaching current. The main winding is here indicated by the small circles at the bottom of the slots. The four pole starting winding is indicated by the circles at the middle of the slots. The six pole starting winding is indicated by the circles at the inner ends of the slots.

*Two-or-six-pole motor*

Referring in detail now to Figs. 4, 5, and 6, similar ideas here apply. The motor winding comprises a main winding consisting of parts 26 and 27, and a starting winding consisting of parts 28 and 29.

The main winding section 26 is connected permanently across the power line conductors 30 and 31, whereby the flow of current is always the same. The other section 27 of the main winding is so connected to and through a double-pole-double-throw switch 32 that the current can be reversed. One section 29 of said starting winding is connected through an automatic centrifugal cutout switch 33 across the said power line. The other section 28 of the starting winding is connected through a similar switch 34 to said switch 32. At the same time that the main winding part 27 is changed by switch 32, this part 28 of the starting winding is also correspondingly changed, so that when the total main winding is connected for two-pole operation, the starting winding also operates on two-pole operation and when the total main winding is connected for six-pole operation, the starting winding also works for six-pole operation.

It may be noted that switch 32 must be of the snap-action type, so as to assure closure in one direction or the other, and thus avoid burning out of windings 26 and 29, as would occur from excessive current in the field windings if the motor did not start.

*Two-or-eight-pole motor*

Figure 7:
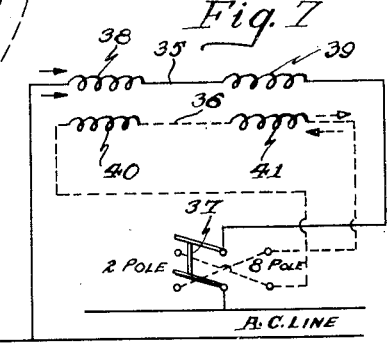
Fig. 7 is a circuit diagram of the main winding of the field member for a two-or-eight-pole motor, the starting winding being here omitted for the sake of simplicity.
Figure 9:
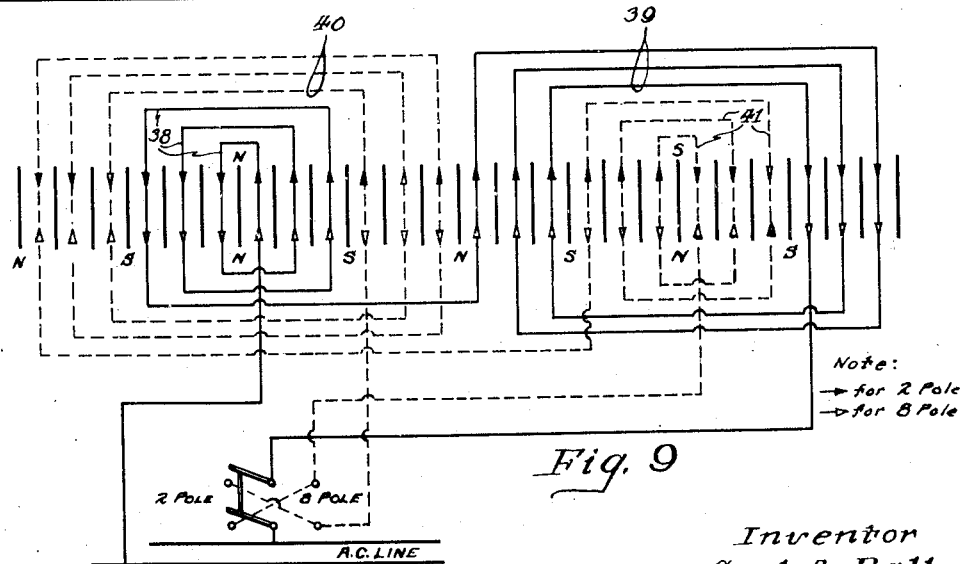
Fig. 9 is a winding diagram corresponding with Fig. 7.

Referring in detail now to Figs. 7, 8 and 9, a two-pole and eight-pole combination is shown. For the sake of simplicity and clarity, the starting winding, the nature of which is obvious, is not indicated at all. The main winding consists of two sections 35 and 36. In section 35 the flow of current is the same for two-pole and eight-pole operations. In the other section 36 which is connected in series with the first section, the flow of current is reversed by means of a double-pole, double-throw switch 37.

The main section 35 comprises two coils 38 and 39 which are shown in Figs. 7, 8 and 9 in full lines. Section 36 comprises two coils 40 and 41 which are shown in Figs. 7, 8 and 9 in broken lines.

In Fig. 8 the circles in the bottom of the slots indicate the winding, and the crosses and dots in the circles indicate the flow of current, retreating and approaching respectively. Fig. 8 shows the main winding connected for two-pole operation.

Referring to Fig. 9, there are two rows of arrows indicated. The upper row of arrows with full heads show the flow of current for two-pole operation, while the lower row of arrows with the hollow heads indicate the flow of current for eight-pole operation.

*Adaptation for standardizing*

The slotted ring type of field member, such, for instance as is identified by numeral 18 on Fig. 2, is adapted for accommodation to a rather general present practice in the economic making of dynamo-electric machines of various capacities and especially to minimizing the variety of distinct structural parts.

A common size and shape of notched or "slotted" laminae may be use for a considerable range, both in polar selection for motor speed determination and in size of field for power capacity requirements, by appropriate arrangement and connection of field windings and by the number of plates used in the field members respectively, as will be understood without illustration. For instance, a motor with a given field plate design and a certain number of plates and certain field windings may have a certain speed and power capacity.

A slower speed may be had by rearranging the windings or the connections thereof to produce more poles, and a greater power capacity may be had through enlargement, by increasing the number of component field ring plates or laminae, as will be apparent to those acquainted with the art.

It is apparent from the foregoing that with a given style and size of field plate punchings motors of different power capacity can be made, more plates being used for the larger capacities. Furthermore with such plates multispeed motors of various speeds, and speed alternatives or selectivities may be made, according to disposition of coils in the field slots.

Economy and efficiency are attained by the use of more nearly all of the field windings in all instances at all speeds, and all of the windings at all speeds in some instances, as for instance in two-and-six pole motors. All windings are used at all speeds in the motor of Figs. 4, 5 and 6.

Although I have only illustrated various two-speed motors, it will be apparent as a matter of principle to those skilled in the art that motors having more than two speeds may be made according to my invention. For instance, a four-speed motor may be made by applying the windings of Figs. 1 and 7 to a common field core, in which instance the motor would have two, four, six or eight poles according to switching adjustments.

A three-speed motor may be had by adding to the field member, wound as in Fig. 7, an appropriate further winding either for four-pole or for six-pole operation. In this instance the motor would have two, four or eight poles in one case or two, six or eight poles in the other case.

It is also to be understood that although my said drawings, Figs. 1 to 9, show only three designs; (1st) two-pole or six-pole motors, (2nd) four-pole or six-pole motors and (3rd) two-pole or eight-pole motors, still my invention is not limited thereto.

It is to be understood that some of the details set forth may be altered or omitted without departing from the spirit of the invention as defined by the following claims:

I claim:

1. A two-speed motor comprising a slotted core and a pair of polar windings thereon having a common winding axis perpendicular to the rotor axis, each of said windings comprising a pair of mutually concentric coils, one wide and the other narrow, means for connecting each coil of one winding to a coil of the other winding to form a pair of coil groups, means for connecting one coil group to a source of alternating current, and switching means for connecting the other coil group to the source of alternating current for one or the other direction of instantaneous current flow relative to the first mentioned coil group.

2. A two-speed motor comprising a slotted core and a pair of polar windings thereon having a common winding axis perpendicular to the rotor axis, each of said windings comprising a pair of mutually concentric coils, one wide coil having but a single turn and one narrow coil having a plurality of turns, means for connecting each narrow coil of one winding to a wide coil of the other winding to form a pair of coil groups, means for connecting one coil group to a source of alternating current, and switching means for connecting the other coil group to the source of alternating current for one or the other direction of instantaneous current flow relative to the first mentioned coil group.

3. A two-speed motor comprising a slotted core and a pair of polar windings thereon having a common winding axis perpendicular to the rotor axis, each of said windings comprising a pair of mutually concentric coils, one wide and the other narrow and each having a plurality of turns, means for connecting each coil of one winding to a coil of the other winding to form a pair of coil groups, means for connecting one coil group to a source of alternating current, and switching means for connecting the other coil group to the source of alternating current for one or the other direction of instantaneous current flow relative to the first mentioned coil group.

4. A two-speed motor comprising a slotted core and a pair of polar windings thereon having a common winding axis perpendicular to the rotor axis, each of said windings comprising a pair of mutually concentric coils, one wide and the other narrow, having an equal number of turns, means for connecting each narrow coil of one winding to a wide coil of the other winding to form a pair of coil groups, means for connecting one coil group to a source of alternating current, and switching means for connecting the other coil group to the source of alternating current for one or the other direction of instantaneous current flow relative to the first mentioned coil group.

CARL A. RALL.